United States Patent
Nobayashi

(10) Patent No.: US 9,307,140 B2
(45) Date of Patent: Apr. 5, 2016

(54) DISTANCE DETECTION APPARATUS, IMAGE SENSING APPARATUS, PROGRAM, RECORDING MEDIUM, AND DISTANCE DETECTION METHOD

(71) Applicant: CANON KABUSHIKI KAISHA, Tokyo (JP)

(72) Inventor: Kazuya Nobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/417,367

(22) PCT Filed: Aug. 27, 2013

(86) PCT No.: PCT/JP2013/073465
§ 371 (c)(1),
(2) Date: Jan. 26, 2015

(87) PCT Pub. No.: WO2014/034918
PCT Pub. Date: Mar. 6, 2014

(65) Prior Publication Data
US 2015/0201121 A1    Jul. 16, 2015

(30) Foreign Application Priority Data

Aug. 31, 2012 (JP) ................................. 2012-191347
Aug. 3, 2013 (JP) ................................. 2013-161913

(51) Int. Cl.
*H04N 5/232* (2006.01)
*G02B 7/34* (2006.01)
(Continued)

(52) U.S. Cl.
CPC .............. *H04N 5/23212* (2013.01); *G02B 7/34* (2013.01); *G03B 13/36* (2013.01); *G06T 7/0026* (2013.01);
(Continued)

(58) Field of Classification Search
CPC .................................................. H04N 5/23212
See application file for complete search history.

(56) References Cited

U.S. PATENT DOCUMENTS

| 4,965,840 A | 10/1990 | Subbarao |
| 5,170,202 A * | 12/1992 | Bell ......................... G02B 7/36 |
| | | 396/80 |

(Continued)

FOREIGN PATENT DOCUMENTS

| JP | 1167610 A | 7/1989 |
| JP | 2756803 B2 | 5/1998 |

(Continued)

OTHER PUBLICATIONS

U.S. Appl. No. 14/501,612, filed Sep. 30, 2014, Kazuya Nobayashi, inventor.

(Continued)

*Primary Examiner* — James Hannett
(74) *Attorney, Agent, or Firm* — Fitzpatrick, Cella, Harper & Scinto

(57) ABSTRACT

A distance detection apparatus includes a calculation unit configured to detect an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels. The calculation unit performs a first process for calculating one of a defocus amount and the object distance by a phase difference method based on the first signal and the second signal and a second process for calculating one of the defocus amount and the object distance by a depth-from-defocus (DFD) method based on the first signal and the second signal.

17 Claims, 12 Drawing Sheets

(51) Int. Cl.
*G03B 13/36* (2006.01)
*G06T 7/00* (2006.01)
*H04N 5/369* (2011.01)
*G02B 7/36* (2006.01)

(52) U.S. Cl.
CPC ............ *G06T 7/0069* (2013.01); *H04N 5/3696* (2013.01); *G02B 7/36* (2013.01); *G06T 2207/10004* (2013.01); *G06T 2207/10148* (2013.01)

(56) References Cited

U.S. PATENT DOCUMENTS

| | | | | |
|---|---|---|---|---|
| 8,675,116 | B2* | 3/2014 | Onuki | G02B 7/346 348/340 |
| 2008/0317454 | A1* | 12/2008 | Onuki | G02B 7/08 396/128 |
| 2010/0194967 | A1 | 8/2010 | Amano | |
| 2011/0310291 | A1 | 12/2011 | Kato et al. | |
| 2012/0057043 | A1 | 3/2012 | Yamamoto | |
| 2012/0148109 | A1 | 6/2012 | Kawamura et al. | |
| 2014/0063234 | A1 | 3/2014 | Nobayashi | |

FOREIGN PATENT DOCUMENTS

| | | |
|---|---|---|
| JP | 2007264299 A | 10/2007 |
| JP | 4027113 B2 | 12/2007 |
| JP | 2009175279 A | 8/2009 |

OTHER PUBLICATIONS

U.S. Appl. No. 14/420,783, filed Feb. 10, 2015, Kazuya Nobayashi, inventor.

International Preliminary Report on Patentability issued in counterpart International Application No. PCT/JP2013/073465, dated Mar. 12, 2015.

International Search Report issued in corresponding International Application No. PCT/JP2013/073465 dated Nov. 25, 2013.

* cited by examiner

DISTANCE DETECTION APPARATUS, IMAGE SENSING APPARATUS, PROGRAM, RECORDING MEDIUM, AND DISTANCE DETECTION METHOD

TECHNICAL FIELD

The present invention relates to a distance detection apparatus, and more particularly, to a distance detection apparatus and the like used for an image sensing apparatus such as a digital camera or digital video camera.

BACKGROUND ART

A solid-state image sensing device adapted to detect the distance to an object by a phase difference method has been proposed for digital cameras and digital video cameras, where pixels having a distance-measuring function (hereinafter referred to as distance-measuring pixels) are used as all or part of pixels in the image sensing device (see PTL 1). The distance-measuring pixel includes plural photoelectric conversion sections such that luminous fluxes passing through different areas on a pupil of a camera lens will be led to the respective photoelectric conversion sections. Optical images are generated by the luminous fluxes passing through the different pupil areas, where the optical images are referred to respectively as an "A-image" and "B-image," which are collectively referred to as "AB-images"). The optical images are acquired based on signals obtained by the photoelectric conversion sections contained in each distance-measuring pixel. An amount of a gap as a relative position change of the AB-images (hereinafter also referred to as an "image gap amount") is detected. A distance to the object can be calculated by converting the image gap amount into an amount of defocus. Defocus is a state in which an imaging plane and image sensing plane of a taking lens do not match each other and the imaging plane of the taking lens is shifted in a direction of an optical axis, where the amount of shift is the amount of defocus. This eliminates the need to move the lens in measuring the distance unlike a conventional contrast method, and thereby enables high-speed, high-accuracy distance measurement.

A depth-from-defocus (DFD) method has been proposed as another method capable of acquiring distance-to-object information (see PTL 2). In the DFD method, two images are acquired with different shooting conditions (focal length, aperture value, and the like) of a taking lens mounted on a digital camera or the like to calculate a blurring correlation value between the images for each pixel. The distance to the object can be calculated for each pixel by referring to a reference look-up table, which defines a relationship between the blurring correlation value and object distance.

CITATION LIST

Patent Literature

PTL 1: Japanese Patent No. 4,027,113
PTL 2: Japanese Patent No. 2,756,803

Technical Problem

In the phase difference method, the image gap amount is detected through a correlation operation of the A-image and the B-image. Consequently, when an object has periodicity, even if the object is located at a position by one cycle out of phase, it is determined that there is a correlation, which might cause plural values to be calculated as candidates for the image gap amount. On the other hand, the DFD method, which needs to acquire two images under different shooting conditions, might not be able to detect the object distance with high accuracy in the case of a moving object. Also, when the shooting conditions are not appropriate, multiple pieces of object distance information might be calculated. In this way, when detecting the distance to an object for a single shot, a conventional distance detection apparatus might calculate the object distance erroneously depending on the object.

Solution to Problem

In view of the above problem, the present invention provides a distance detection apparatus comprising a calculation unit adapted to detect an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels. The calculation unit performs a first process for calculating one of a defocus amount and the object distance by a phase difference method based on the first signal and the second signal, and a second process for calculating one of the defocus amount and the object distance by a DFD method based on the first signal and the second signal.

Further features of the present invention will become apparent from the following description of exemplary embodiments with reference to the attached drawings.

Advantageous Effects of Invention

The present invention, which performs distance detection processes using the two methods, can implement a distance detection apparatus capable of calculating an object distance with high accuracy irrespective of an object, an image sensing apparatus using the distance detection apparatus, a distance detection method, and the like.

DESCRIPTION OF EMBODIMENTS

Figure 1:
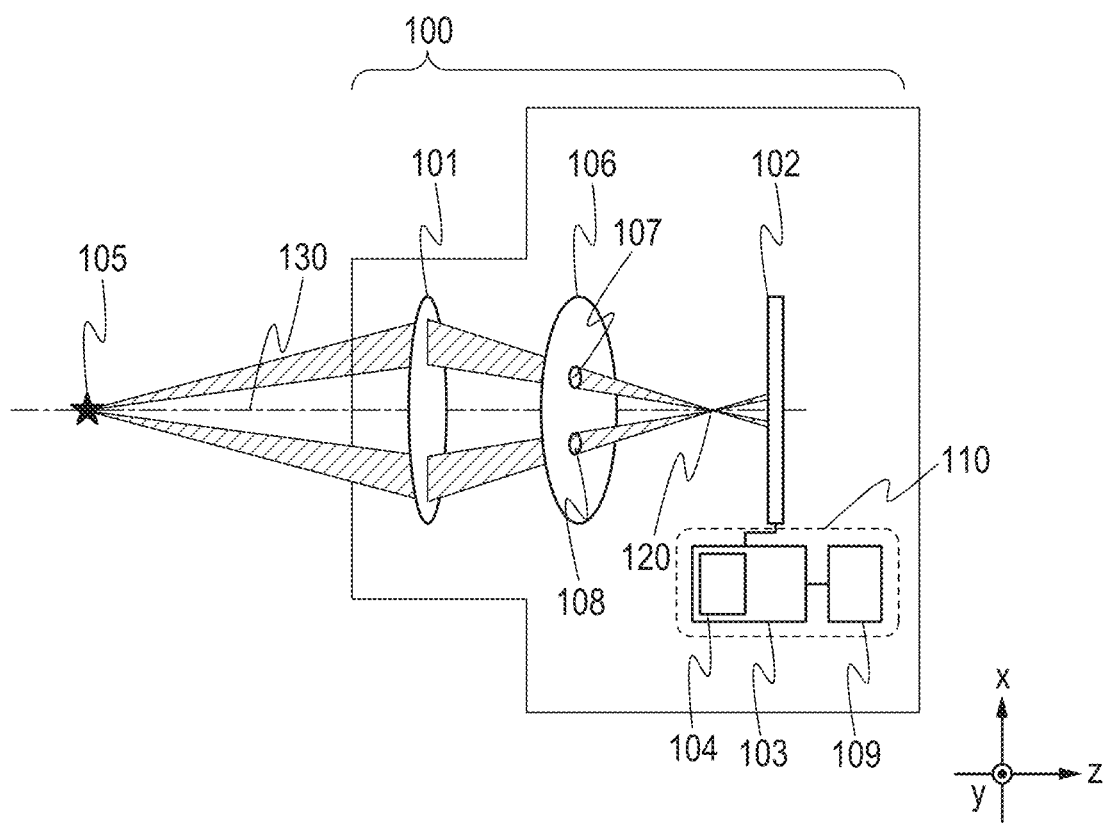
FIG. 1 is a schematic diagram showing a digital camera equipped with a distance detection apparatus according to the present invention.

The present invention includes the following. The present invention detects a distance to an object based on a first object image signal formed by a luminous flux that has passed through a first pupil of an imaging optical system and a second object image signal formed by a luminous flux that has passed through a second pupil area of the imaging optical system, which are generated by using an image sensing unit including an array of multiple pixels. For that, the present invention performs arithmetic operations including a phase difference-based distance detection process for calculating one of a defocus amount and object distance based on a relative position change of the first object image signal and second object image signal and a DFD-based distance detection process for calculating one of the defocus amount and object distance based on a difference in blurs of the first object image signal and second object image signal. The phase difference-based distance detection process and DFD-based distance detection process can be used in combination with other processes and the combination can be determined in various ways by taking into consideration the conditions of the object, the required accuracy of distance detection, and the equipment configuration around a calculation section as appropriate.

A distance detection apparatus, distance detection method, and the like according to the present invention will be described below with reference to the drawings. In so doing, a digital camera will be described in embodiments as an example of an image sensing apparatus equipped with the distance detection apparatus, but the application of the present invention is not limited thereto. For example, the distance detection apparatus can be used for image sensing apparatus, such as digital video cameras and live view cameras, as well as for digital distance meters. Also, throughout the following description given with reference to the drawings, components having the same functions in all the drawings are denoted by the same reference numerals, and a redundant description thereof will be omitted whenever possible.

First Embodiment

A digital camera equipped with a distance detection apparatus according to a first embodiment of the present invention will be described.

<Configuration of Distance Detection Apparatus>

FIG. 1 shows a digital camera 100 equipped with a distance detection apparatus according to the present embodiment. The digital camera 100 includes a taking lens 101, an image sensing device 102, which is an image sensing unit, and a distance detection apparatus 110. The distance detection apparatus 110 includes a distance detector 103 and a memory 109, where the distance detector 103 is a distance detection unit. FIG. 1 shows a state in which a focal position 120 is defocused from the image sensing device 102.

Figure 2A:
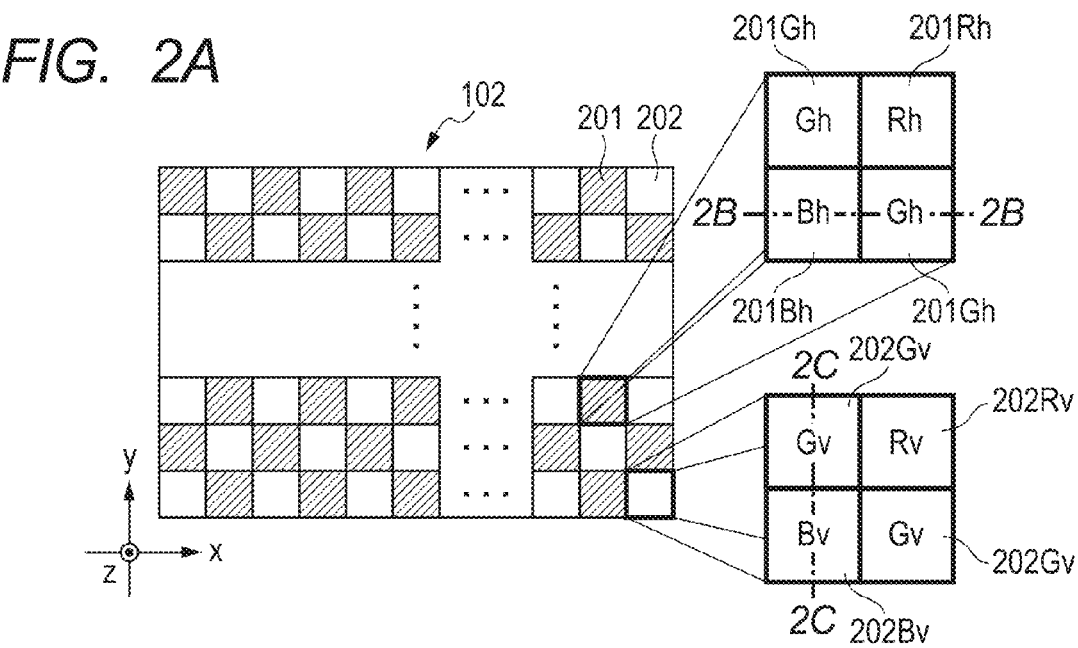
FIGS. 2A, 2B and 2C are diagrams illustrating an image sensing device and pixel in a distance detection apparatus according to a first embodiment of the present invention.
Figure 2B:
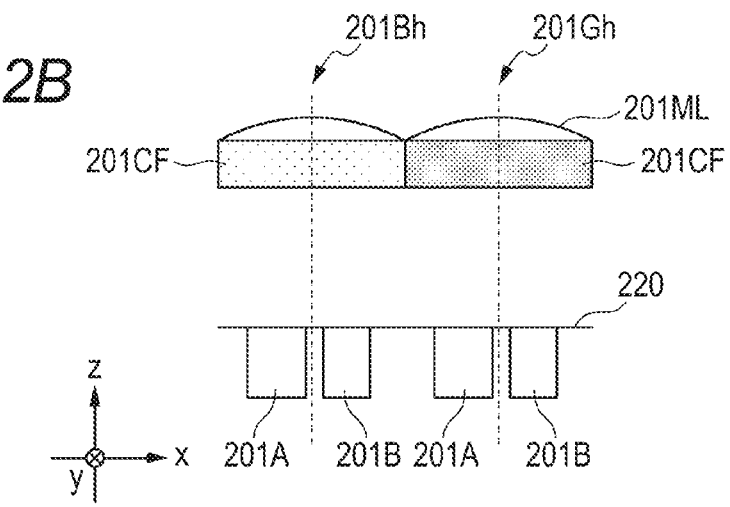
Figure 2C:
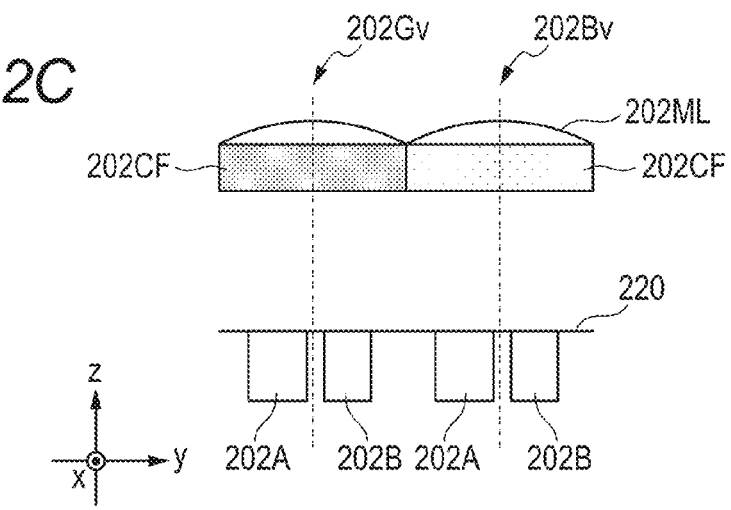

The image sensing device 102 according to the present embodiment is shown in FIGS. 2A to 2C. Pixel groups 201 and pixel groups 202 each made up of two rows by two columns of pixels are shown in FIG. 2A. In the pixel group 201, green pixels 201Gh are placed in a diagonal direction, while a red pixel 201Rh and a blue pixel 201Bh are placed in another diagonal direction. Similarly, in the pixel group 202, green pixels 202Gv are placed in a diagonal direction, while a red pixel 202Rv and a blue pixel 202Bv are placed in another diagonal direction. In the image sensing device 102, the pixel groups 201 and pixel groups 202 are arranged in a checkered pattern.

FIG. 2B shows a schematic sectional view of the pixel group 201 taken along line 2B-2B in FIG. 2A. FIG. 2B shows a micro lens 201ML, a color filter 201CF, and photoelectric conversion sections 201A and 201B. FIG. 2C shows a schematic sectional view of the pixel group 202 taken along line 2C-2C in FIG. 2A. FIG. 2C shows a micro lens 202ML, a color filter 202CF, and photoelectric conversion sections 202A and 202B. FIGS. 2B and 2C also show a light receiving surface 220, which is in an xy plane (+z side plane) on a light incidence side of the photoelectric conversion section. In the image sensing device 102 according to the present embodiment, two photoelectric conversion sections are contained in one pixel (each pixel such as a green pixel), and the power of micro lenses 201ML and 202ML is set such that the light receiving surface 220 and an exit pupil 106 will be optically conjugate. This arrangement allows the photoelectric conversion sections 201A and 201B (as well as 202A and 202B) to receive luminous fluxes passing through different areas of the exit pupil 106, respectively. Also, in each pixel groups 201 and 202, the two groups of photoelectric conversion sections are placed 90° apart from each other group. With this configuration, when luminous fluxes passing through different areas obtained by dividing the exit pupil 106 in an x direction are received by the photoelectric conversion sections 201A and 201B in the pixel group 201 respectively, the object distance of an object with contrast changes in the x direction can be detected. Also, when luminous fluxes passing through different areas obtained by dividing the exit pupil 106 in a y direction are received by the photoelectric conversion sections 202A and 202B in the pixel group 202 respectively, the object distance of an object with contrast changes in the y direction can be detected. Generally, a process whereby luminous fluxes passing through different areas obtained by dividing the exit pupil 106 in a predetermined direction are received by different respective photoelectric conversion sections is referred to as pupil division, and the predetermined direction is referred to as a pupil division direction. For example, with respect to the photoelectric conversion sections 201A and 201B, the pupil division direction is the x direction. In the pixels of the image sensing device 102 according to the present embodiment, an xy section of the light receiving surface 220 is shaped differently between the photoelectric conversion sections (201A and 202A) adapted to mainly receive the A-image and the photoelectric conversion sections (201B and 202B) adapted to mainly receive the B-image. As the xy sections are shaped differently, the photoelectric conversion sections adapted to receive the A-image and the photoelectric conversion sections adapted to receive the B-image do not have linear symmetry (are asymmetric) to each other with respect to an axis which, being perpendicular to the pupil division direction, passes through a conjugate point on the light receiving surfaces 220 optically conjugate to a pupil centroid on the exit pupil 106. An image signal generated by the photoelectric conversion section (201A or 202A) depends on the A-image, while an image signal generated by the photoelectric conversion section (201B or 202B) depends on the B-image. In view of this, hereinafter the photoelectric conversion sections (201A and 202A) will be referred to as "A-pixels" and the photoelectric conversion sections (201B and 202B) will be referred to as "B-pixels." In this way, by making the A-pixels and B-pixels asymmetric to each other, the sensitivities of the A-pixels and B-pixels are made asymmetric to each other, as described later with reference to FIGS. 3, 6A, and 6B. As the sensitivities of the A-pixels and B-pixels are made asymmetric to each other, the A-pixels and B-pixels receive respective luminous fluxes that pass through different areas on the exit pupil and have different effective f-numbers. Therefore, distance detection based on a phase difference method and the DFD method described later, can be performed using the A-image generated by the A-pixels and the B-image generated by the B-pixels. The term "asymmetry" herein means a condition in which the xy sectional shapes and the sensitivity distribution on the light receiving surfaces 220 of the photoelectric conversion sections do not have rotational symmetry with respect to a conjugate point optically conjugate to the pupil centroid or do not have linear symmetry with respect to an axis which, being perpendicular to the pupil division direction, contains the conjugate point.

A method for detecting distance information about an object 105 will be described by taking the pixel group 201 as an example. To detect the distance information about the object 105, an image of the object 105 is formed on the image sensing device 102 by the taking lens 101. Plural distance-measuring pixels (pixel groups 201 and 202) are arranged in a two-dimensional matrix on the image sensing device 102. Each distance-measuring pixel acquires a first object image signal (A-image signal) and second object image signal (B-image signal) of the luminous fluxes passing through different areas (first pupil area 107 and second pupil area 108) of the exit pupil 106. Furthermore, distance information about the object is detected when a process flow described later is performed by a calculation section 104 (calculation unit) in the distance detector 103.

Figure 3:
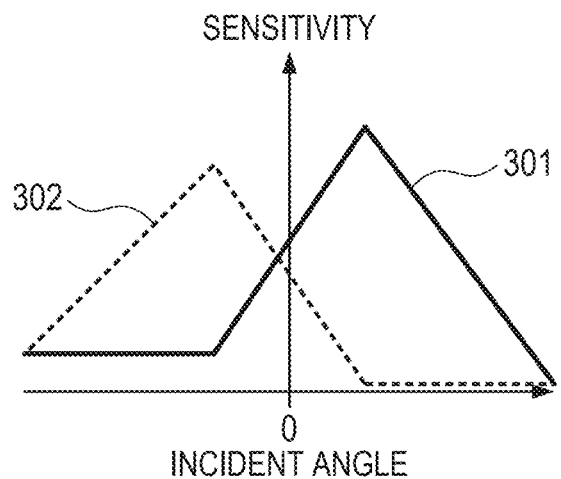
FIG. 3 is a diagram illustrating pixel sensitivity of a distance-measuring pixel according to the first embodiment.

The sensitivity of the distance-measuring pixel according to the present embodiment has incident angle dependence asymmetric about an incident angle=0° as shown in FIG. 3. In FIG. 3, the abscissa represents the incident angle of a beam with respect to an optical axis 130 (in FIG. 1), while the ordinate represents sensitivity. Also, a solid line 301 represents the sensitivity of the A-pixels adapted to mainly receive a luminous flux from the first pupil area 107, while a broken line 302 represents the sensitivity of the B-pixels adapted to mainly receive the luminous flux from the second pupil area 108. According to the present embodiment, the pixel groups 201 and 202 made up of distance-measuring pixels are placed on an entire area of the image sensing device 102. As the distance-measuring pixels shown in FIGS. 2A to 2C are placed on the entire area, an image can be generated using the image signals obtained by the photoelectric conversion sections (201A and 202A) of the A-pixels and the image signals obtained by the photoelectric conversion sections (201B and 202B) of the B-pixels.

<Process Flow of Distance Detection>

The process of detecting distance information about the object in the present embodiment will be described in detail with reference to FIG. 4. In Step S401, an A-image and a B-image of the object are acquired, and image signals are transmitted to the distance detector 103. Step S402 is a defocus amount calculation step, in which a defocus amount is calculated based on the image signals of the A-image and the B-image acquired in S401. The process of S402 will be described later with reference to FIGS. 5A to 5C. Step S403 involves converting the defocus amount into an object distance. The defocus amount is converted into an object distance based on the defocus amount calculated in S402 and information about the taking lens 101 (focal length, a principal point position, and the like).

Next, a process of the defocus amount calculation step in S402 will be described with reference to FIGS. 5A to 5C. In S402, the process is performed in line with FIG. 5A. Step S501 is a phase difference-based defocus amount calculation step in which the defocus amount is calculated by the phase difference method. A more detailed process of S501 will be described later with reference to FIG. 5B. Step S502 is a DFD-based defocus amount calculation step in which the defocus amount is calculated by the DFD method. A more detailed process of S502 will be described later with reference to FIG. 5C. Step S503 is a defocus amount selection step in which a highly reliable defocus amount is selected. In Step S503, the defocus amount obtained in S501 and defocus amount obtained in S502 are read out from the memory 109. Furthermore, the two defocus amounts are compared, and the defocus amount with higher reliability is selected.

Next, the process of S501 will be described with reference to FIG. 5B. Step S5011 is a base line length calculation step. FIGS. 6A and 6B are diagrams illustrating a method for calculating a base line length. FIG. 6A is a diagram schematically showing the exit pupil 106 and the image sensing device 102 of the digital camera 100 in FIG. 1. The sensitivities of the A-pixels and B-pixels shown in FIG. 3 are projected to the exit pupil 106 from the image sensing device 102. In so doing, the projection is performed by starting at a center position of a range in which an image gap amount of the A-image and B-image is detected in the image sensing device 102. A pupil sensitivity distribution obtained by projecting pixel sensitivities is shown in FIG. 6B. In the pupil sensitivity distribution of FIG. 6B, the darker the area is, the higher the sensitivity. In FIG. 6B, a frame 602 represents a frame of the exit pupil. FIG. 6B also shows center-of-gravity positions 601A and 601B of pupil sensitivity distributions of the A-pixels and B-pixels. The length of a line joining the center-of-gravity position 601A and the center-of-gravity position 601B equals a base line length w. Note that in the image sensing device 102 according to the present embodiment, the xy section of the light receiving surface 202 is shaped differently between the photoelectric conversion sections (201A and 202A) of the A-pixels and photoelectric conversion sections (201B and 202B) of the B-pixels. Consequently, the pupil sensitivity distribution of the A-pixels and the pupil sensitivity distribution of the B-pixels do not have rotational symmetry to each other with respect to an axis (in the y direction) which passes through the pupil centroid ((x, y)=(0, 0) in FIG. 6B) and is perpendicular to the pupil division direction.

Step S5012 next is an image gap amount calculation step. In S5012, an image gap amount r is calculated through a correlation operation of the A-image and the B-image. A known technique can be used for the correlation operation. For example, a correlation value S (k) can be calculated using Equation 1, and the image gap amount r can be calculated based on k which satisfies S(k)=0. In equation 1, A(i) is the image signal data of the A-image, B(i) is the image signal data of the B-image, i is a pixel number, k is a relative shift amount between the A-image and the B-image, and n is a target pixel range (a distance-measuring range) used to calculate the correlation value S(k).

$$S(k) = \sum_{i=1}^{n-1} |A(i+k+1) - B(i)| - |A(i+k) - B(i+1)| \qquad \text{Equation 1}$$

Step S5013 next is a defocus amount calculation step. A defocus amount ΔL can be calculated by substituting the base line length w calculated in S5011 and the image gap amount r calculated in S5012 into a conversion formula of Equation 2.

$$\Delta L = \frac{rL}{w - r}$$ Equation 2

Incidentally, L is a distance from the image sensing device 102 to the exit pupil 106. Herein, the defocus amount in a −z axis direction with reference to the image sensing device 102 is calculated as a negative value. Then, the calculated defocus amount is stored in the memory 109, for use in S503. Although a case in which a single image gap amount r is calculated has been described above by way of example, plural candidates for the image gap amount may be calculated in S5012 depending on the object. In such a case, plural defocus amounts each corresponding to one of the image gap amounts are calculated in S5013 and stored in the memory 109.

The process of S502 will be described with reference to FIG. 5C. Step S5021 is a blurring evaluation value calculation step in which blurring evaluation values of the A-image and the B-image are calculated. Respective blurring evaluation values are calculated using the image signals of the A-pixels and the B-pixels. According to the present embodiment, respective MTFs (modulation-transfer-function) of the A-pixel image signal and the B-pixel image signal are calculated as blurring evaluation values. Step S5022 is a blurring correlation value calculation step in which a blurring correlation value is calculated, where the blurring correlation value represents a difference in blurs of the first object image signal and the second object image signal. According to the present embodiment, a ratio between the MTF of the A-pixel image signal and the MTF of the B-pixel image signal is calculated as a blurring correlation value. Step S5023 is a defocus amount calculation step in which the defocus amount is calculated from the blurring correlation value. A reference look-up table which defines a relationship between the blurring correlation value and the defocus amount is prepared in advance. The blurring correlation value is converted into a defocus amount using the blurring correlation value obtained in S5022 and the reference look-up table, and consequently the defocus amount is calculated. As in the case of S5013, the defocus amount calculated in S5023 is stored in the memory 109, for use in S503.

Through the processes described above, the distance detection apparatus 110 according to the present embodiment can perform object distance detection with high accuracy irrespective of the object.

<The Reason Why High Accuracy Distance Calculation can be Performed Irrespective of the Object>

Figure 7A:
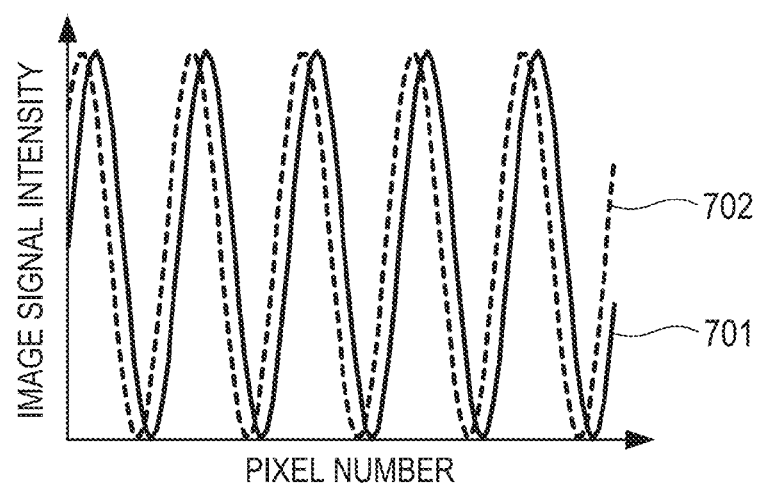
FIGS. 7A, 7B and 7C are explanatory diagrams of principles of operation according to the first embodiment.
Figure 7B:
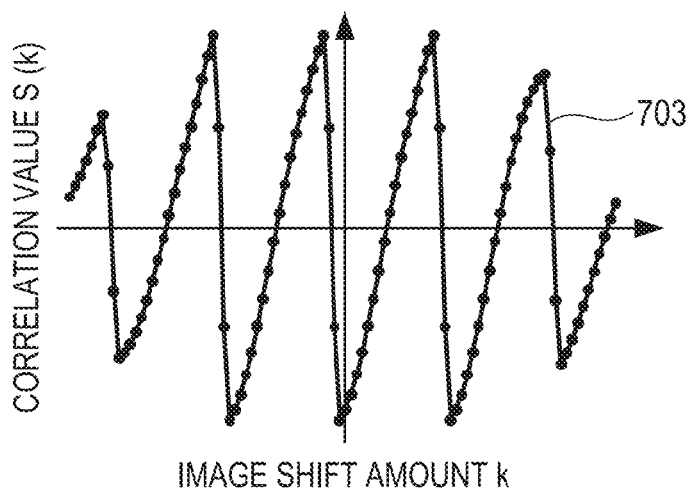

Next, the reason why the distance detection apparatus 110 according to the present embodiment can perform distance detection with high accuracy irrespective of the object will be described with reference to FIGS. 7A to 7C. FIG. 7A shows the intensities of the image signal (solid line 701) of the A-pixels and the image signal (broken line 702) of the B-pixels obtained by the image sensing device 102, where the ordinate represents the image signal strength and the abscissa represents the pixel number in the image sensing device 102. As can be seen from FIG. 7A, the object has a periodic luminance distribution. As the A-pixels and the B-pixels placed in the image sensing device 102 receive respective luminous fluxes from different pupil areas, image signals with a relative position change (image gap amount) between the A-image and the B-image can be obtained. Results of a correlation operation performed to detect the amount of the image gap between the A-image and the B-image using Equation 1 are shown in FIG. 7B, where the ordinate represents the correlation value S(k) and the abscissa represents an image shift amount k. Since the object has a periodic luminance distribution, plural values of k which satisfies S(k)=0 are output, where S(k)=0 means a high correlation.

Figure 6A:
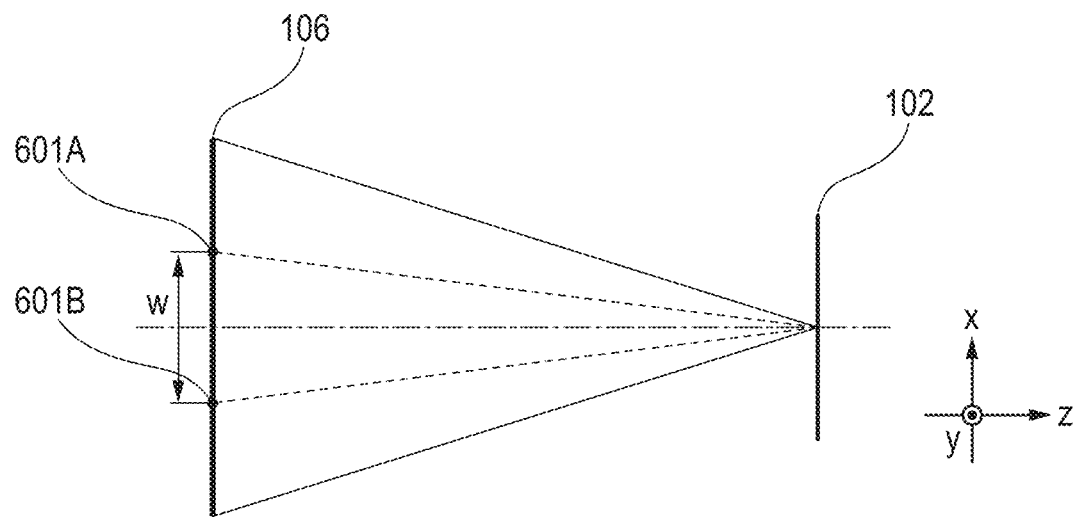
FIGS. 6A and 6B are diagrams illustrating a method for calculating a base line length.
Figure 6B:
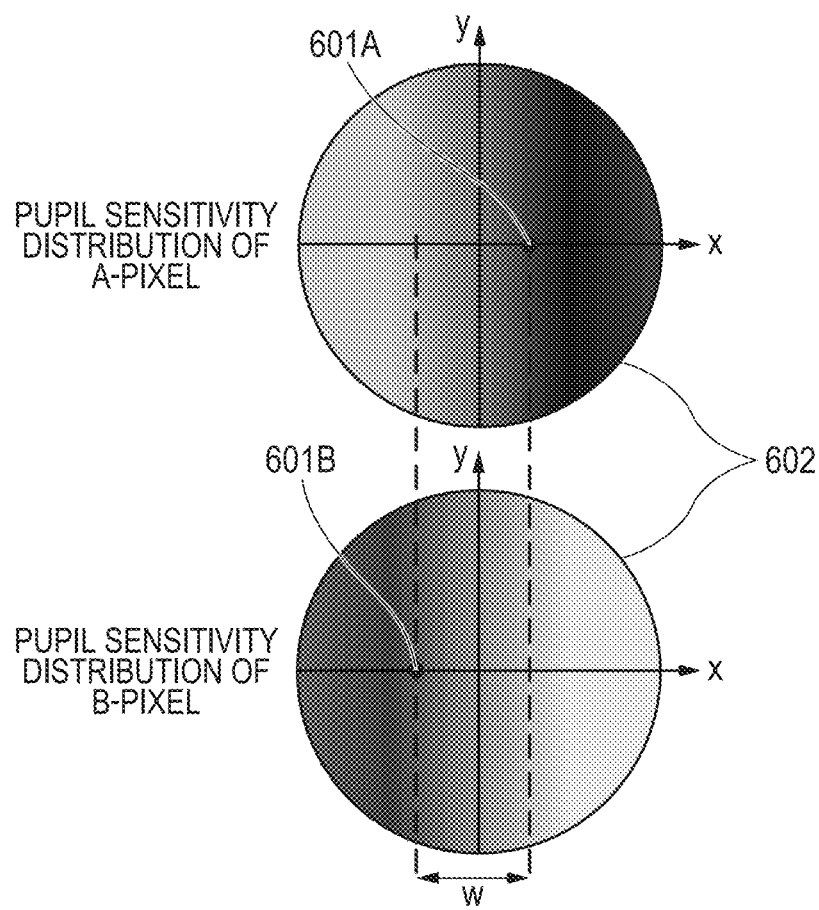
Figure 7C:
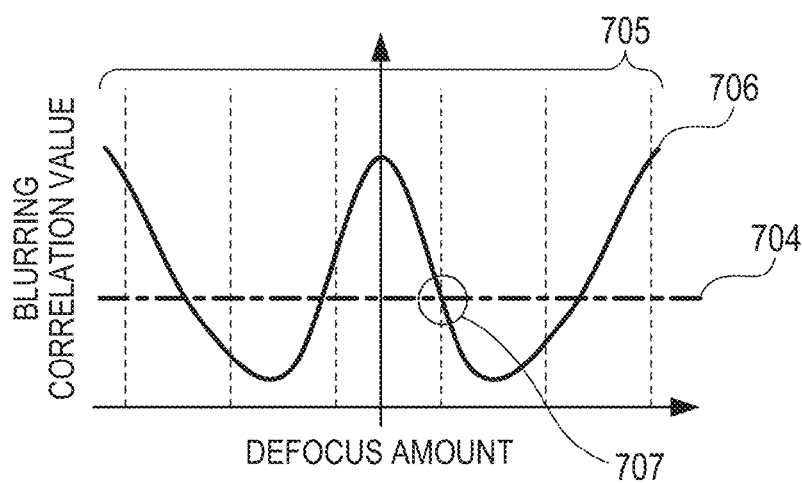

A reference look-up table which defines a relationship between the blurring correlation value and the defocus amount is indicated by a solid line 706 in FIG. 7C, where the abscissa represents the defocus amount and the ordinate represents the blurring correlation value. The image sensing device 102 according to the present embodiment has an asymmetric pixel sensitivity characteristic as shown in FIG. 3. This means that the luminous fluxes received by the A-pixels and the B-pixels have different effective f-numbers because the transmittance distribution on the pupil with respect to the A-pixels and the B-pixels differ as shown by the pupil sensitivity distribution of FIG. 6B. Since the effective f-number differs between the A-pixels and the B-pixels, the blurring evaluation value for each defocus amount differs between the A-pixels and the B-pixels. In FIG. 7C, the blurring correlation value calculated in Step S5022 of the present embodiment is indicated by an alternate long and short dash line 704, and the defocus amount calculated in Step S5013 is indicated by a broken lines 705. When an object has a periodic luminance distribution as shown in FIG. 7C, plural image gap amounts are calculated. Therefore, as indicated by the broken lines 705 in FIG. 7C, plural defocus amounts (broken line 705) are output by the calculation by the phase difference method. On the other hand, when a blurring correlation value is calculated by the DFD method, a point of intersection between the alternate long and short dash line 704 and solid line 706 represents a defocus amount. When there are plural intersection points, plural defocus amounts are output by the calculation by the DFD method as well.

With the distance detection apparatus 110 according to the present embodiment, the defocus amounts calculated, respectively by the phase difference method and the DFD method are compared in the defocus amount selection step of Step S503, and a defocus amount with higher reliability is selected. According to the present embodiment, the defocus amounts obtained by the phase difference method and the DFD method become substantially equal at a point of intersection (indicated by a circle 707 in FIG. 7C) among the alternate long and short dash line 704, the broken lines 705, and the solid line 706, and thus the value at the point of intersection is selected as a defocus amount with high reliability. Although in the present embodiment, defocus amounts are calculated in Steps S501 and S502, the object distance may be calculated by converting the defocus amount into the object distance using information about the taking lens 101. In that case, it is not necessary to perform the process of Step S403 in FIG. 4. An object having a periodic luminance distribution has been described above as an example, but plural image gap amounts are also detected when objects at different distances coexist in a range in which a correlation operation of the A-image and the B-image is performed by the phase difference method. Even in such a case, the object distance can be calculated with high accuracy by comparing the defocus amounts obtained by the phase difference method and the DFD method.

Using the image sensing device 102 containing distance-measuring pixels having a pixel sensitivity characteristic which is asymmetric between the A-pixels and B-pixels, the distance detection apparatus 110 according to the present embodiment can perform phase difference-based distance detection and the DFD-based distance detection. That is, the calculation unit of the distance detection unit can perform a phase difference-based distance detection process for calculating the object distance based on a relative position change of the first and second object image signals and a DFD-based distance detection process for calculating the object distance based on a blurring correlation value between the first and second object image signals. Furthermore, by comparing the object distance detected by the phase difference method and the object distance detected by the DFD method with each other and selecting an object distance with higher reliability, distance detection can be performed with high accuracy irrespective of the object. That is, the calculation unit can further perform an object distance selection process for selecting an object distance with the higher reliability based on an object distance detected in a phase difference-based distance detection step and an object distance detected in a DFD-based distance detection step. The calculation unit here performs the phase difference-based distance detection process and the DFD-based distance detection process based on the first object image signal and the second object image signal obtained from at least a partial area (distance-measuring ranges for detecting image gap amounts) of the plural pixels of the image sensing unit.

Although the photoelectric conversion sections of the A-pixels and the B-pixels are configured to be asymmetric to each other to make the pixel sensitivities of the A-pixels and the B-pixels asymmetric to each other, asymmetric pixel sensitivities may be obtained by making a micro lens eccentric. Also, when a waveguide is installed between the color filter and the photoelectric conversion section, asymmetric pixel sensitivities can be obtained if a waveguide portion is made to have an asymmetric configuration without making the micro lens eccentric. Further, although a difference is created between the blurring evaluation values of the image signals of the A-pixels and the B-pixels by making the pixel sensitivities of the A-pixels and the B-pixels asymmetric to each other, another method may be used as long as there is a difference between the blurring evaluation values of the image signals of the A-pixels and the B-pixels. For example, the best focus position can be varied between the image signals of the A-pixels and the B-pixels by making the lateral aberration of the taking lens 101 asymmetric with respect to a pupil center (more generally the pupil centroid, but also referred to herein as the pupil center), and a difference may be created in the blurring evaluation value in this way. That is, the lateral aberration in the first pupil area and the lateral aberration in the second pupil area may be made asymmetric to each other with respect to the pupil centroid on the exit pupil of the imaging optical system. In order to perform phase difference-based distance detection, it is sufficient if the respective centers of gravity of the pupil sensitivity distributions of the A-pixels and the B-pixels projected onto the exit pupil are located at different positions. On the other hand, in order to perform DFD-based distance detection, it is sufficient if the effective f-number of the luminous flux received by the A-pixels and the effective f-number of the luminous flux received by the B-pixels differ from each other, where the former f-number depends on the pupil sensitivity distribution of the A-pixels projected onto the exit pupil while the latter f-number depends on the pupil sensitivity distributions of the B-pixels projected onto the exit pupil. By making the pixel sensitivities of the A-pixels and the B-pixels asymmetric to each other with respect to the pupil centroid, distance-measuring pixels can be configured to be able to perform both phase difference-based distance detection and DFD-based distance detection.

Figure 5A:
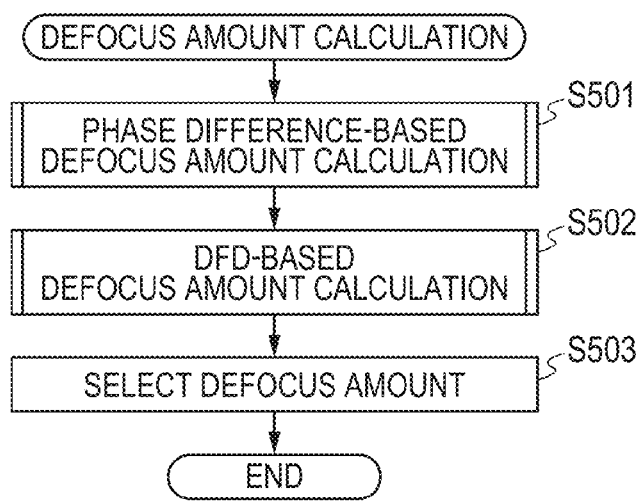
FIGS. 5A, 5B and 5C are flowcharts of object distance detection.
Figure 5B:
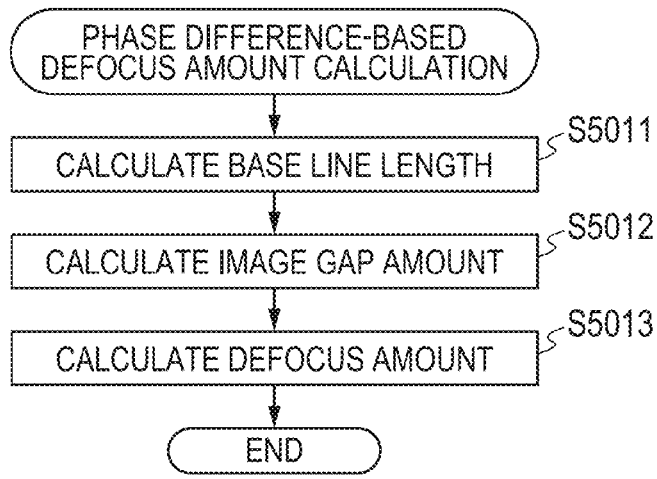
Figure 5C:
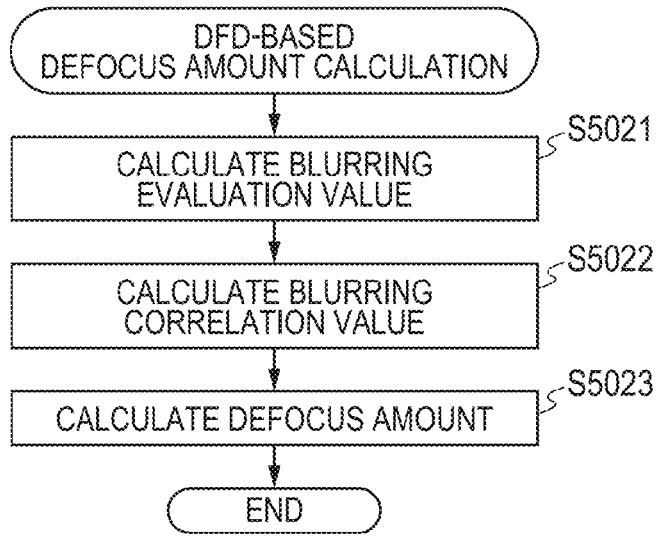
Figure 8A:
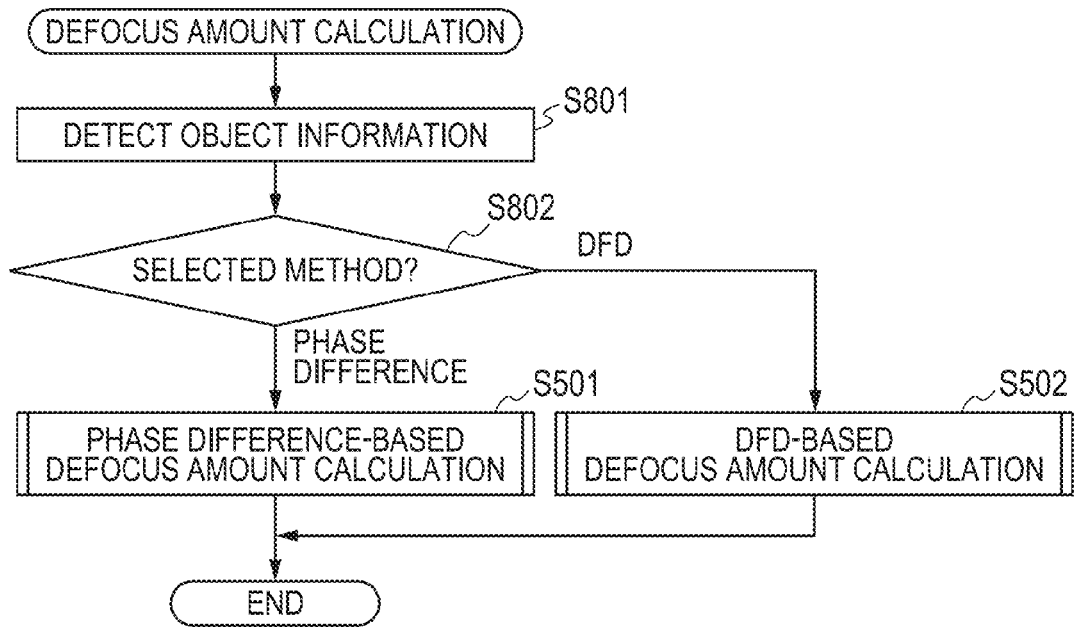
FIGS. 8A and 8B are flowcharts of object distance detection.
Figure 8B:
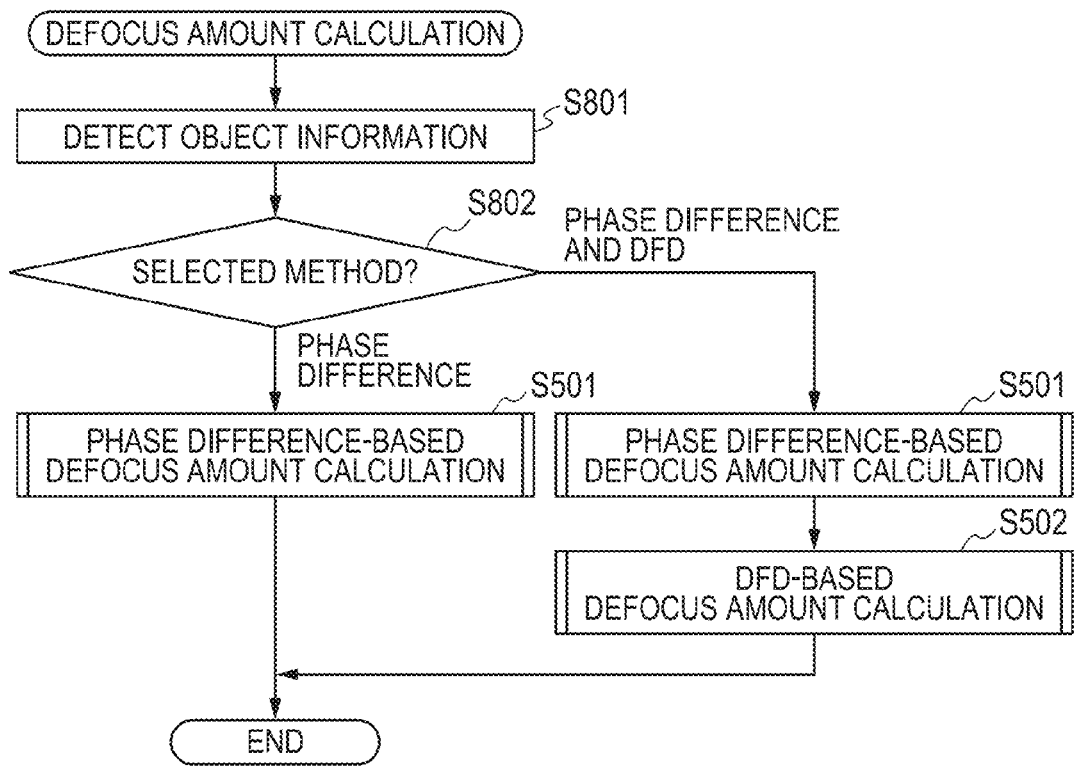

Although the calculation section 104 in the distance detection apparatus 110 according to the present embodiment performs the process of S402 according to FIGS. 5A to 5C, the process may be performed based on object information or in line with FIG. 8A. Step S801 is an object information detection step for detecting object information. In this step, the periodicity of the objects is detected based on luminance information about the objects and it is determined from contrast of the object whether there is an object at a different distance. That is, the calculation unit can further perform an object information detection process for detecting either of contrast information and periodicity information about the object image using at least one of the first object image signal and the second object image signal. In Step S802 next, i.e., in a method selection step, it is determined, based on a result of S801, which process to perform, the process of S501 or S502. The process of S502 (DFD-based defocus amount calculation) is performed if the direction in which the object contrast changes coincides with the pupil division direction, if the objects have periodicity, or if an object which differs in distance is included. Otherwise, the process of S501 (phase difference-based defocus amount calculation) is performed. Regarding the presence or absence of periodicity, desirably it is determined that there is periodicity when the period of the object image is smaller than a maximum image gap amount calculated based on a predetermined maximum defocus amount and the f-number of the taking lens 101 and it is determined that there is no periodicity when the period is equal to greater than the maximum image gap amount. By branching a process based on the object information, the computational complexity necessary for calculation of the object distance is reduced, thereby enabling high-speed processing. When plural defocus amounts are calculated in the DFD-based defocus amount calculation step, the process of S502 in FIG. 8A may be replaced with the processes of S501 and S502 as shown in FIG. 8B. That is, the calculation unit may perform the phase difference-based distance detection process and the DFD-based distance detection process when the periodicity information detected in the object information detection process is smaller than a predetermined threshold, and perform only the phase difference-based distance detection process when the object information is equal to or greater than the predetermined threshold.

Figure 9:
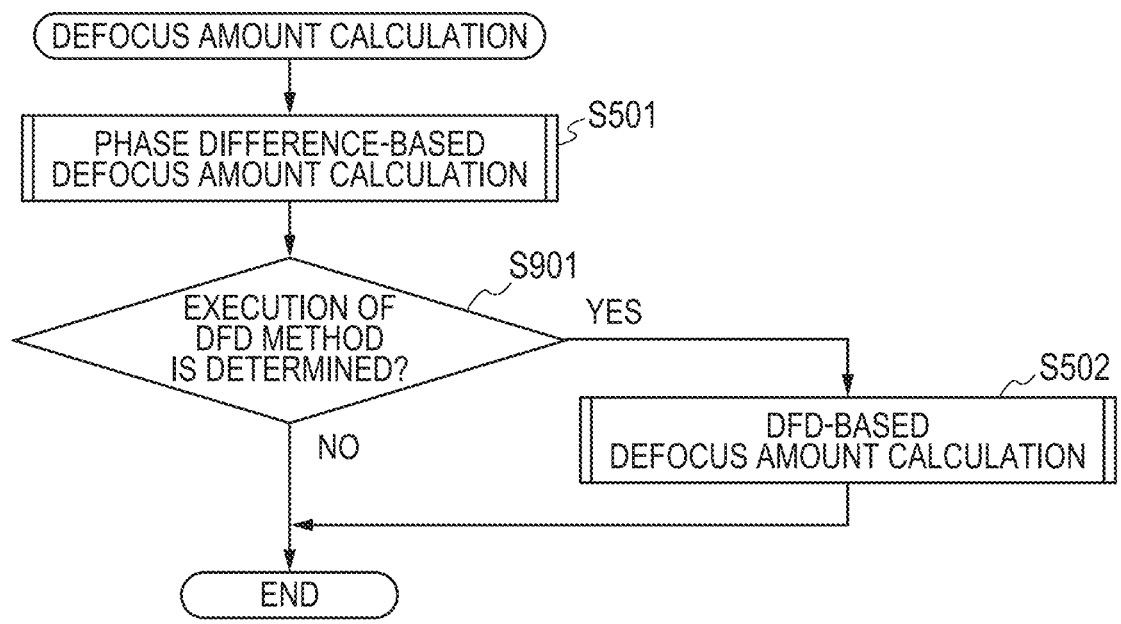
FIG. 9 is a flowchart of object distance detection.

Also, to determine in a simpler manner whether to perform the DFD-based distance detection process, a process in line with FIG. 9 may be performed as the process of S402. Step S901 is a DFD method execution determination step to determine whether to perform the DFD-based distance detection process. In S901, it is determined whether or not plural defocus amounts have been calculated in S501. If plural defocus amounts have been calculated, the process of S502 is performed. If only a single defocus amount has been output, the processing is finished directly. The processing in line with FIG. 9 eliminates the needs to detect object information, and consequently the object distance can be detected faster. Note that in the process of FIG. 9, the processes of S502 and S501 may be replaced with each other, thereby performing the process of S501 when it is determined in S901 that plural defocus amounts have been calculated in the DFD-based distance detection process. The calculation unit performs a DFD method execution determination process for determining whether to perform the DFD-based distance detection process, based on at least one of information about an amount of noise and the number of pieces of distance information calculated in the phase difference-based distance detection step. Alternatively, the calculation unit performs a phase difference method execution determination process for determining whether to perform the phase difference-based distance detection process, based on at least one of information about the amount of noise and the number of pieces of distance information calculated in the DFD-based distance detection step. Although MTF is used as a blurring evaluation value in S5021 of the present embodiment, any value that can evaluate the blur of the A-image and the B-image may be used, and a blurring evaluation value of the A-image and the B-image may be calculated in real space. Furthermore, the processes of S5021 and S5022 may be integrated into a process for calculating only a blurring correlation value. If the processes of S5021 and S5022 are integrated with each other, the computational complexity necessary for calculating the object distance is reduced, thereby enabling high-speed processing.

When an image sensing device of small size is used in such an image sensing apparatus as a digital still camera, it is difficult to obtain a clear difference in blurring correlation values due to a great depth of field. In such a case, a method is available which includes calculating a blurring evaluation value after applying a high-pass filter to the image signals of the A-image and the B-image. The use of the high-pass filter allows the object distance to be calculated with higher accuracy. As a high-pass filter, a gradient filter or Laplacian filter may be used, where the gradient filter is a primary differential filter while the Laplacian filter is a secondary differential filter.

Note that although in the present embodiment, a highly reliable defocus amount is calculated automatically by performing the defocus amount selection step in Step S503 of FIG. 5A, the process of S503 is not indispensable. Instead of performing the process of S503, users of the digital camera 100 may be allowed to select an appropriate one of the plurality of calculated object distances.

Next, an embodiment different from the first embodiment will be described.

Second Embodiment

Figure 10A:
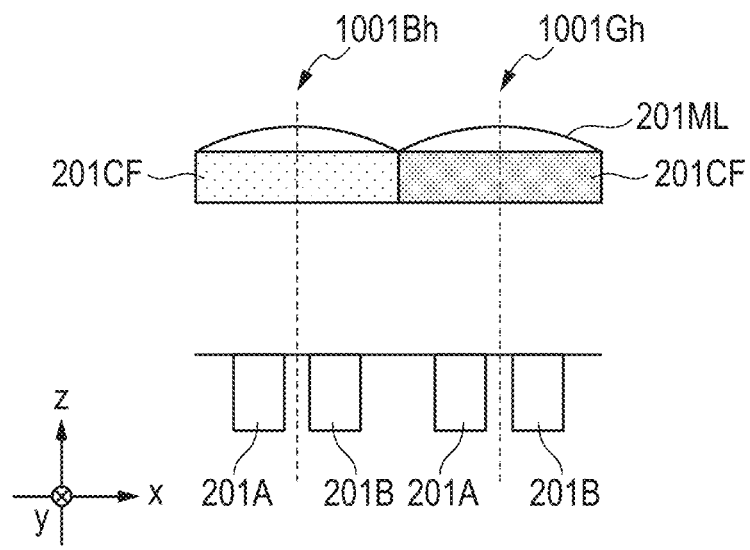
FIGS. 10A and 10B are diagrams illustrating pixels according to a second embodiment.
Figure 10B:
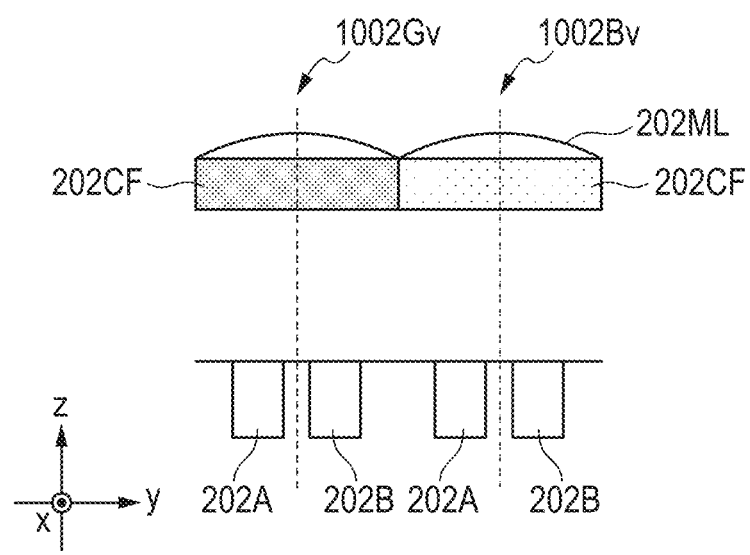
Figure 12A:
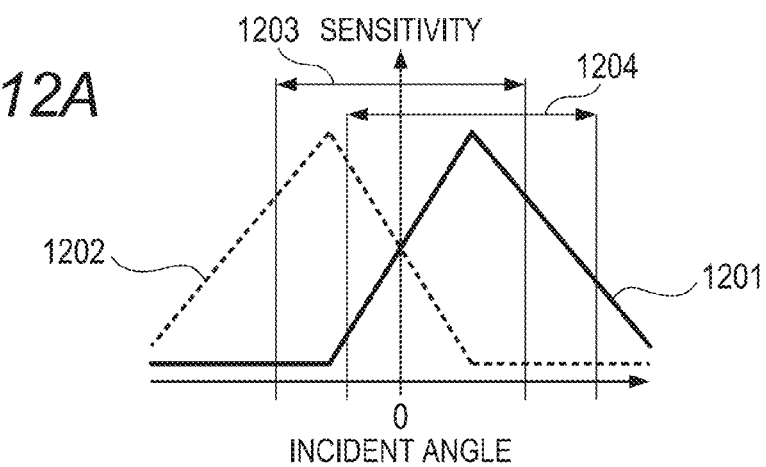
FIGS. 12A, 12B and 12C are explanatory diagrams of a second embodiment.

A digital camera 100 according to the present embodiment has a configuration similar to that of the first embodiment except for a distance detection apparatus 110. An image sensing device 102 according to the present embodiment includes distance-measuring pixels of which schematic sectional view is shown in FIGS. 10A and 10B. A pixel 1001Bh is put in the place of the pixel 201Bh in FIG. 2A, and a pixel 1001Gh is put in the place of the pixel 201Gh. A pixel 1002Gv is put in the place of the pixel 202Gv in FIG. 2A, and a pixel 1002Bv is put in the place of the pixel 202Bv. Unlike in FIGS. 2B and 2C, the photoelectric conversion sections (201A and 202A) of the A-pixels and the photoelectric conversion sections (201B and 202B) of the B-pixels are placed symmetrically. Consequently, the A-pixels and the B-pixels have symmetric pixel sensitivities with respect to an incident angle=0° as shown in FIG. 12A. The abscissa and ordinate in FIG. 12A are identical with those in FIG. 3, and a solid line 1201 represents the pixel sensitivity of the A-pixels while a broken line 1202 represents the pixel sensitivity of the B-pixels.

Figure 4:
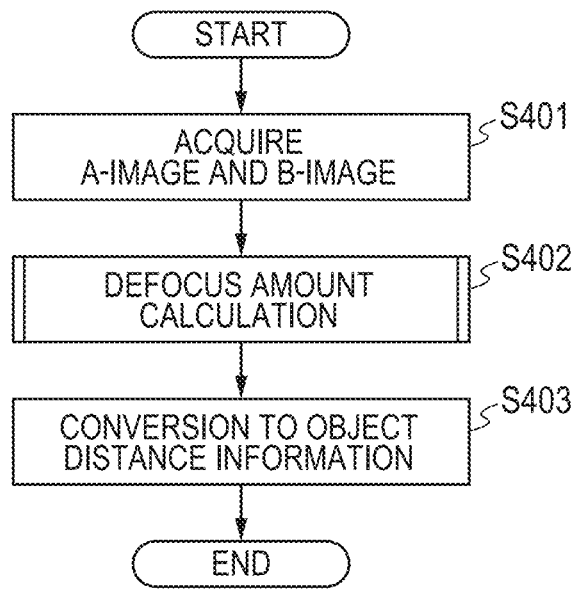
FIG. 4 is a flowchart of object distance detection.
Figure 11A:
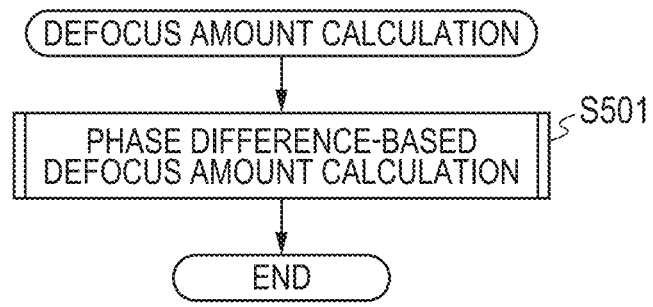
FIGS. 11A and 11B are flowcharts of object distance detection.
Figure 11B:
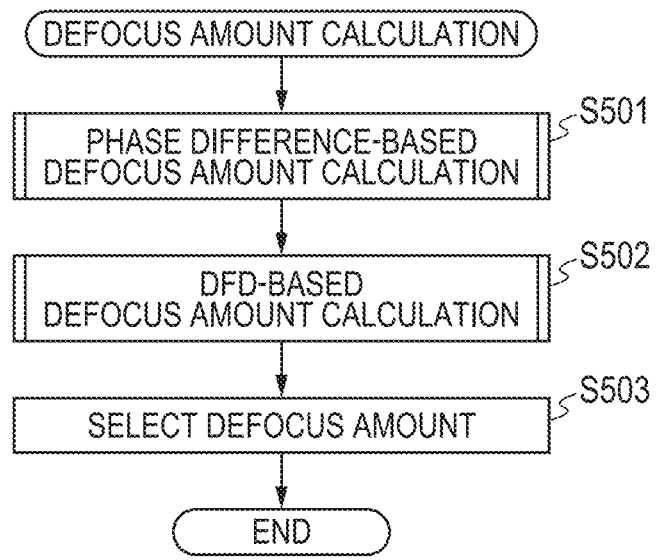

The calculation section 104 according to the present embodiment performs a process in line with FIG. 4 to detect the distance to the object. According to the present embodiment, as the process of S402, a process in line with FIG. 11A is performed near the optical axis 130 in the image sensing device 102, and a process in line with FIG. 11B is performed in a peripheral area. Near the optical axis 130, only the phase difference-based defocus amount calculation step is performed as shown in FIG. 11A. On the other hand, in the peripheral area of the image sensing device 102, the phase difference-based defocus amount calculation step and the DFD-based defocus amount calculation step are performed as shown in FIG. 11B. That is, according to the present embodiment, in which the photoelectric conversion sections (201B and 202B) are placed symmetrically, the calculation unit performs the phase difference-based distance detection process and the DFD-based distance detection process in the peripheral area of the image sensing unit and performs the phase difference-based distance detection process in a central area of the image sensing unit.

Figure 12B:
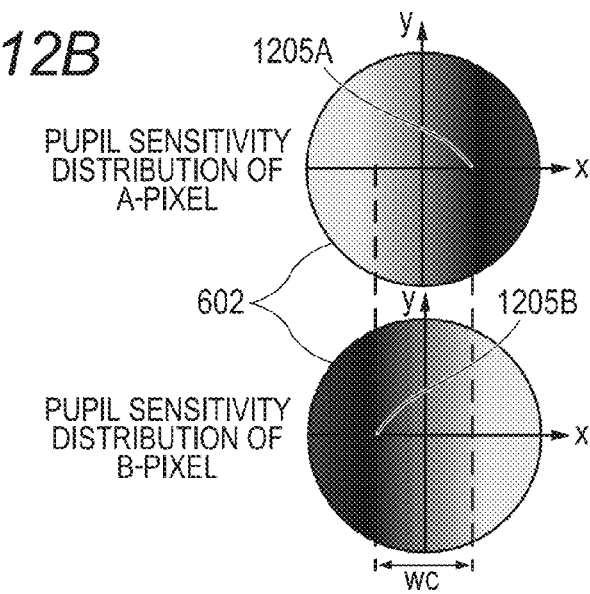

Generally, the taking lens 101 of the digital camera 100 does not make up an image-side telecentric optical system, and has a limited exit pupil distance. Therefore, an angular range of the incident luminous flux changes depending on image height. Near the optical axis 130, the luminous flux in an angular range 1203 of FIG. 12A enters the image sensing device 102. Near the optical axis 130, the A-pixels and the B-pixels have substantially symmetric pupil sensitivity distributions, such as shown in FIG. 12B, with respect to the center of the exit pupil. The length of a line joining center-of-gravity positions 1205A and 1205B of the pupil sensitivity distributions equals a base line length wc. Positions at which the A-pixels and the B-pixels have maximum sensitivity are located on an inner periphery of the frame 602 of the pupil, allowing the base line length wc to be increased near the optical axis 130.

Figure 12C:
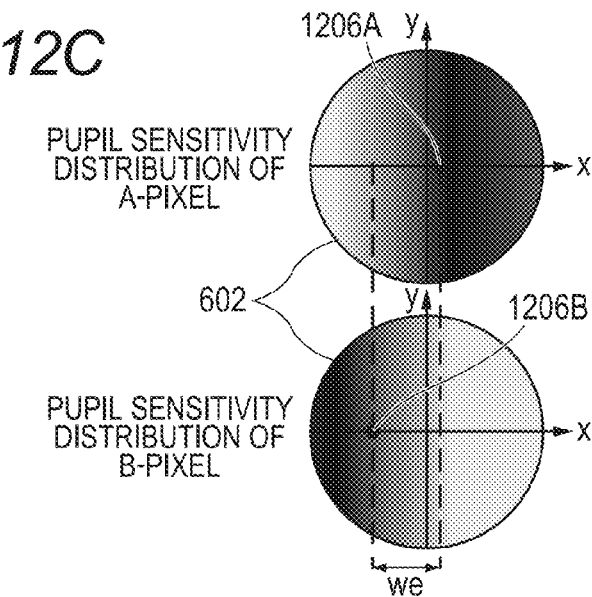

On the other hand, in the peripheral area of the image sensing device 102, a luminous flux in an angular range 1204 in FIG. 12A enters the image sensing device 102, and thus the A-pixels and the B-pixels have pixel sensitivities asymmetric with respect to the center of the angular range 1204. That is, the A-pixels and the B-pixels have asymmetric pupil sensitivity distributions such as shown in FIG. 12C. In the peripheral area of the image sensing device 102, since the A-pixels and the B-pixels have asymmetric pixel sensitivities, the DFD-based object distance detection can be performed by making use of the fact that the blurring correlation value varies with each defocus amount as in the case of the first embodiment. Note that the phase difference method can detect the object distance by converting an image gap amount into a defocus amount, where the image gap amount is generated by reception of luminous fluxes from different areas of the exit pupil 106 by the A-pixels and the B-pixels. The length of a line joining center-of-gravity positions of pupil sensitivity distributions 1206A and 1206B in the peripheral area equals a base line length we. In the peripheral area, the position at which the A-pixels have maximum sensitivity lies toward the center of the pupil and the position at which the B-pixels have maximum sensitivity is located outside the frame 602 of the pupil, decreasing the base line length we. Also, in the peripheral area, the frame 602 of the pupil becomes smaller due to vignetting of the taking lens 101, serving as a contributory factor in reducing the base line length we.

In the phase difference method, the image gap amount r is converted into a defocus amount (and further into an object distance) using Equation 2. Generally, the image signal obtained by the image sensing device 102 contains noise such as shot noise. If the image gap amount r is calculated based on a signal containing noise using a correlation operation, a detection error will occur in the image gap amount. When the base line length is long, the detection error in the image gap amount has only a small impact on a detection error in the calculated defocus amount. On the other hand, when the base line length is short, the detection error in the defocus amount due to the detection error in the image gap amount increases.

Since the defocus amount is converted into an object distance, a detection error in the object distance in the peripheral area is larger than that near the optical axis 130.

Thus, in the distance detection apparatus 110 according to the present embodiment, the calculation unit performs the phase difference-based defocus amount calculation process and the DFD-based defocus amount calculation process in the peripheral area. In this case, the defocus amounts calculated by the two methods are compared in the defocus amount selection step in Step S503 of FIG. 5A, thereby calculating a highly accurate defocus amount, the distance to the object can be calculated with high accuracy even in the peripheral area.

Figure 13:
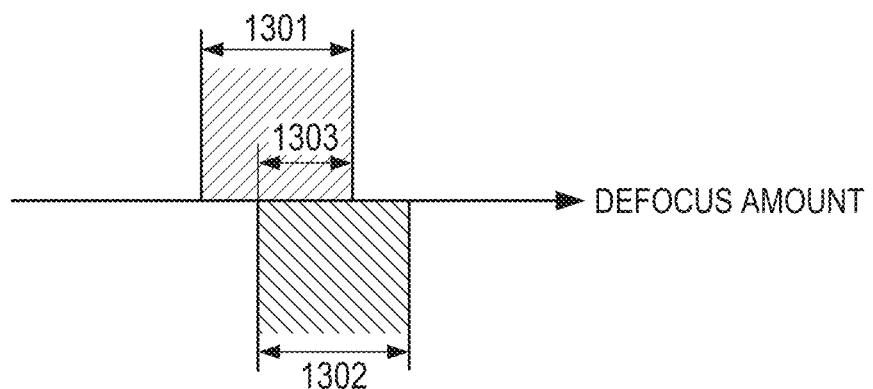
FIG. 13 is an explanatory diagram of the second embodiment.

The reason why the object distance can be detected with high accuracy in the peripheral area will be described in more detail. FIG. 13 is a graphical representation in which the abscissa represents the defocus amount. An error range of the defocus amount calculated by the phase difference method is represented by an area 1301 and an error range of the defocus amount calculated by the DFD method is represented by an area 1302. As the range of the area 1301 and the range of the area 1302 are compared, it can be determined that an area 1303 where the two ranges overlap represents a highly reliable defocus amount. Since the area 1303 has a smaller range than the area 1301, the area 1303 allows the distance to the object to be calculated with high accuracy. The widths of the areas 1301 and 1302 depend on noise. As an indicator of how much noise is generated, the luminous quantity of the digital camera 100 or luminance information about the object image can be used. By storing the area 1301 and the area 1302 for each ISO setting in the memory 109 beforehand, the widths of the area 1301 and area 1302 can be set based on a setting of the digital camera 100.

Although a process in line with FIG. 11B is performed in the peripheral area, the process of FIG. 11B may be replaced with the process of FIG. 8A, 8B, or 9 as in the case of the first embodiment. In so doing, in the method selection step of S802 and the DFD method execution determination step of S901, it is desirable to take the ISO setting on the side of the digital camera 100 into consideration as an indicator of the amount of noise. When the ISO setting and the amount of noise are small, the distance to the object can be calculated with high accuracy regardless of which of the phase difference method and the DFD method is used. The use of a process in line with FIG. 8A, 8B, or 9 allows the distance to the object to be calculated more quickly. That is, the calculation unit can select a method for the distance detection process to be performed in a subsequent step, based on at least one of the following: the information detected in the object information detection step, and the amount of noise in the first object image signal and/or second object image signal.

With the distance detection apparatus 110 according to the present embodiment, the image sensing device 102 is configured such that the pixel sensitivity of the image sensing device 102 will be as shown in FIG. 12A in the entire area of the image sensing device 102. This means that the photoelectric conversion sections of each pixel are optically conjugate to the exit pupil located at infinity. From the standpoint of improving the object distance detection accuracy of the phase difference method regardless of the image height in the image sensing device 102, desirably the pixel sensitivity of each pixel is set according to the exit pupil position of the taking lens 101 such that the photoelectric conversion sections will be optically conjugate to the exit pupil located at a finite distance. When the pixel sensitivity of each pixel is set such that the photoelectric conversion sections will be optically conjugate to the exit pupil located at a finite distance, the center of the angular range of the luminous flux incident on the pixel can be set near the incidence angle=0° in FIG. 12A in the peripheral area as well, improving the distance detection accuracy of the phase difference method. Even when the photoelectric conversion sections of each pixel are set so as to be optically conjugate to the exit pupil located at a finite distance, the lateral aberration of the taking lens 101 in the peripheral area is asymmetric with respect to the center of the exit pupil, enabling DFD-based distance detection. Note that methods for setting the photoelectric conversion sections of each pixel so as to be optically conjugate to the exit pupil located at a finite distance includes a method which makes the micro lenses 201ML and 202ML eccentric according to the image height of each pixel.

Next, an embodiment different from the first and second embodiments will be described.

Third Embodiment

A digital camera 100 according to the present embodiment has a configuration similar to that of the first embodiment except for a distance detection apparatus 110. An image sensing device 102 according to the present embodiment includes only the pixel groups 201 shown in FIG. 2A. That is, the image gap between the A-image and the B-image occurs only in the x direction, but does not occur in the y direction. Therefore, the relative position change of the first and second object image signals is one directional within the image sensing unit.

The calculation section 104 according to the present embodiment performs a process in line with FIG. 8A as the process of S402 in FIG. 4. In the present embodiment, the direction of the object contrast is detected in the object information detection step of S801. In the method selection step of S802 next, based on the direction of contrast detected in S801, a method to be used to detect the object distance is selected from among the methods of S501 and S502. That is, the calculation unit selects the method for the distance detection process to be performed in a subsequent step, based on the direction of contrast detected in the object information detection step. More specifically, if the direction of contrast of the object is detected to be the x direction in S801, the phase difference-based object distance detection of S501 is performed. On the other hand, if the direction of contrast is detected to be the y direction, the DFD-based object distance detection of S502 is performed. That is, the calculation unit performs the DFD-based distance detection process when the direction of contrast detected in the object information detection step is different from the direction of the relative position change of the first and second object image signals, but performs the phase difference-based distance detection when the directions coincide.

In the phase difference-based defocus amount calculation step, as described in the second embodiment, the larger the detection error in the image gap amount, the larger the detection error in the object distance. To reduce the detection error in the image gap amount, it is necessary to reduce sampling intervals by densely arranging the distance-measuring pixels in which amounts of the image gap between the A-image and the B-image are generated in the same direction. The distance detection apparatus 110 according to the present embodiment contains only the pixel groups 201 in which the image gap amounts are generated only in the x direction. Consequently, the distance-measuring pixels making up the pixel groups 201 can be placed densely, allowing the detection error in the object distance to be reduced. Regarding the objects whose direction of contrast is oriented in the y direction, the object distance can be detected by calculating the defocus amount by the DFD method.

With the distance detection apparatus 110 according to the present embodiment, by configuring the image sensing device 102 so that the image gap between the A-image and the B-image on each distance-measuring pixel will occur only in the x direction, the object distance can be detected with high accuracy in relation to the objects whose direction of contrast is oriented in the x direction. In the present embodiment, in view of the fact that generally the digital camera 100 is frequently used by being held in the landscape orientation, only the pixel groups 201 are placed so that the image gap will occur only in the x direction. However, only the pixel groups 202 may be placed, so that image gap will occur only in the y direction.

Also, distance-measuring pixels may be placed such that the image gap will occur only in such a direction as to satisfy the relationship y=x and a process in line with FIG. 8B may be performed as the process of S402. This configuration allows phase difference-based object distance detection to be performed regardless of the direction of contrast. However, when the direction of contrast does not satisfy y=x, the base line length is shorter than the base line length when only the pixel groups 201 are placed, reducing the object distance detection accuracy provided by the phase difference method. To allow for such a situation, if the direction of contrast does not satisfy y=x, it is determined in the method selection step of S802 to carry out the steps of S501 and S502. Therefore, the object distance can be detected with high accuracy. Further, the object distance can also be detected with high accuracy by performing a process in line with FIG. 9 as the process of S402, as in the case of the second embodiment.

Other Embodiments

The present invention can also be accomplished by the following embodiments. That is, a storage/recording medium (e.g., non-transitory computer-readable storage medium) having stored thereon program code of software which implements the functions of the embodiments described above (such as functions of the calculation section) is supplied to the distance detection apparatus. Then, a computer (or a CPU, MPU or the like) of the calculation section reads the program code stored in the storage medium to execute the above-mentioned functions. In this case, the program code read from the storage medium realizes the functions of the embodiments described above, and the program and the storage medium having the program stored thereon may constitute the present invention.

Further, through execution of the program code read by the computer, an operating system (OS) or the like operating on the computer performs a part or all of the actual processing based on instructions of the program code. A case where the functions of the embodiments described above are realized by the processing is also encompassed by the present invention. Furthermore, the program code read from the storage medium may be written in a function expansion card, which is inserted in the computer, or a memory included in a function expansion unit, which is connected to the computer. A case where the function expansion card or a CPU included in the function expansion unit performs a part or all of the actual processing based on the instructions of the program code, and the functions of the embodiments described above are realized by the processing is also encompassed by the present invention. When the present invention is applied to the above-mentioned storage medium, the storage medium stores program code corresponding to the flowchart described above. When the present invention is applied to the above-mentioned storage medium, the storage medium stores program code corresponding to the flowcharts described above.

When application of the present invention to digital cameras or the like is considered, the present invention may be understood as an apparatus that is used more suitably in so-called image-sensing-surface distance measurement apparatus in which an image sensing unit for sensing the object image is also used for detecting the distance than in the distance detection apparatus (for use in single-lens reflex camera or the like) specialized in detecting the distance independent of the image sensing unit. As described above, the calculation section of the distance detection apparatus according to the present invention may be constructed by using an integrated circuit in which semiconductor elements are integrated, and may be constituted of one or more ICs, LSIs, system LSIs, microprocessing units (MPU), central processing units (CPU), or the like. When the calculation unit is constituted of the microprocessing unit (MPU), central processing unit (CPU), or the like, the calculation section may be understood as a computer. The program according to the present invention may be installed on a computer of an image sensing apparatus equipped with a predetermined imaging optical system, a predetermined image sensing unit, and the computer to enable the image sensing apparatus to detect the distance with high accuracy. The computer may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Using the distances detected by the present invention, a distance distribution (distance map) corresponding to the image provided by the image sensing apparatus can be generated. Also, since an amount of blur of object in the image depends on the defocus amount, image processing including optional blurring, a post-shooting refocusing (process of focusing on an arbitrary position) and the like, may be performed appropriately by processing the obtained image based on the distance distribution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-191347, filed Aug. 31, 2012, and No. 2013-161913, filed Aug. 3, 2013 which are hereby incorporated by reference herein in their entirety.

The invention claimed is:
1. A distance detection apparatus comprising:
a calculation unit configured to detect an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels, wherein the calculation unit performs:
a first process for calculating a defocus amount by a phase difference method based on a relative position change between the first signal and the second signal, and
a second process for calculating the defocus amount by a depth-from-defocus method based on a difference of blur between the first signal and the second signal.

2. The distance detection apparatus according to claim 1, wherein the calculation unit further performs an object distance selection process for selecting a defocus amount with highest reliability from among a plurality of defocus amounts calculated in the first process and the second process.

3. The distance detection apparatus according to claim 1, wherein the calculation unit performs the first process and the second process for at least part of the multiple pixels.

4. The distance detection apparatus according to claim 1, wherein the first pupil area and the second pupil area are asymmetric with respect to a center of gravity of an exit pupil of the imaging optical system.

5. The distance detection apparatus according to claim 1, wherein:
each of the pixels includes a first photoelectric conversion section arranged to receive a luminous flux that has passed through the first pupil area and a second photoelectric conversion section arranged to receive a luminous flux that has passed through the second pupil area; and
shapes of the first photoelectric conversion section and the second photoelectric conversion section do not have linear symmetry with respect to an axis which is perpendicular to a straight line joining a center-of-gravity position of the first pupil area and a center-of-gravity position of the second pupil area and which includes a point located on an incidence-side plane of the first photoelectric conversion section and the second photoelectric conversion section and optically conjugate to a center of gravity of an exit pupil of the imaging optical system.

6. The distance detection apparatus according to claim 1, wherein lateral aberration in the first pupil area and lateral aberration in the second pupil area are asymmetric with respect to a center of gravity of an exit pupil of the imaging optical system.

7. The distance detection apparatus according to claim 3, wherein
the calculation unit performs the first process and the second process using the first signal and the second signal for pixels in a peripheral area of the image sensing unit and performs only the first process using the first signal and the second signal for pixels in a central area of the image sensing unit.

8. A distance detection apparatus comprising:
a calculation unit configured to detect an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels,
wherein the calculation unit performs:
an object information detection process for detecting one of contrast change information and periodicity information of contrast change about an object image using at least one of the first signal and the second signal; and
a process for calculating a defocus amount at least by a phase difference method based on a relative position change between the first signal and the second signal in a first case in which the periodicity information of contrast change detected in the object information detection process is equal to or larger than a predetermined threshold or a direction of contrast change of the object image coincides with a direction of the relative position change between the first signal and the second signal; or
a process for calculating the defocus amount at least by a depth-from-defocus method based on a difference of blur between the first signal and the second signal in a second case in which the periodicity information of contrast change detected in the object information detection process is smaller than the predetermined threshold or the direction of contrast change of the object image is different from the direction of the relative position change between the first signal and the second signal.

9. The distance detection apparatus according to claim 8, wherein in the first case, the calculation unit further performs a process for calculating the defocus amount by the depth-from-defocus method based on the difference of blur between the first signal and the second signal.

10. The distance detection apparatus according to claim 9, wherein in the first case, based on at least one of information detected in the object information detection process and amount-of-noise information about the first signal and/or the second signal, the calculation unit performs a process for determining to perform the process for calculating the defocus amount by the depth-from-defocus method based on the difference of blur between the first signal and the second signal in addition to the phase difference method based on the relative position change between the first signal and the second signal.

11. The distance detection apparatus according to claim 8, wherein the direction of the relative position change between the first signal and the second signal is same direction within the image sensing unit.

12. An image sensing apparatus comprising:
an image sensing unit including an array of multiple pixels;
an imaging optical system arranged to form an image of an object on the image sensing unit; and
the distance detection apparatus according to claim 1.

13. A non-transitory computer-readable storage medium configured to store a program for a computer which is configured to detect an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels, wherein the program causes the computer to:
calculate a defocus amount by a phase difference method based on a relative position change between the first signal and the second signal; and
calculate the defocus amount by a depth-from-defocus method based on a difference of blur between the first signal and the second signal.

14. A distance detection method for detecting an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels, the distance detection method comprising:

calculating a defocus amount by a phase difference method based on a relative position change between the first signal and the second signal; and calculating the defocus amount by a depth-from-defocus method based on a difference of blur between the first signal and the second signal.

15. The distance detection apparatus according to claim 8, wherein in the second case, the calculation unit further performs a process for calculating the defocus amount by the phase difference method based on the relative position change between the first signal and the second signal.

16. A non-transitory computer-readable storage medium configured to store a program for a computer which is configured to detect an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels, wherein the program causes the computer to:

perform an object information detection process for detecting one of contrast change information and periodicity information of contrast change about an object image using at least one of the first signal and the second signal; and calculate a defocus amount at least by a phase difference method based on a relative position change between the first signal and the second signal in a first case in which the periodicity information of contrast change detected in the object information detection process is equal to or larger than a predetermined threshold or a direction of contrast change of the object image coincides with a direction of the relative position change between the first signal and the second signal; or calculate the defocus amount at least by a depth-from-defocus method based on a difference of blur between the first signal and the second signal in a second case in which the periodicity information of contrast change detected in the object information detection process is smaller than the predetermined threshold or the direction of contrast change of the object image is different from the direction of the relative position change between the first signal and the second signal.

17. A distance detection method for detecting an object distance to an object based on a first signal formed by a luminous flux that has passed through a first pupil area of an imaging optical system and a second signal formed by a luminous flux that has passed through a second pupil area of the imaging optical system different from the first pupil area, which are generated by using an image sensing unit including multiple pixels, the distance detection method comprising:

performing an object information detection process for detecting one of contrast change information and periodicity information of contrast change about an object image using at least one of the first signal and the second signal; and calculating a defocus amount at least by a phase difference method based on a relative position change between the first signal and the second signal in a first case in which the periodicity information of contrast change detected in the object information detection process is equal to or larger than a predetermined threshold or a direction of contrast change of the object image coincides with a direction of the relative position change between the first signal and the second signal; or calculating the defocus amount at least by a depth-from-defocus method based on a difference of blur between the first signal and the second signal in a second case in which the periodicity information of contrast change detected in the object information detection process is smaller than the predetermined threshold or the direction of contrast change of the object image is different from the direction of the relative position change between the first signal and the second signal.

* * * * *